(12) United States Patent
Kawamata et al.

(10) Patent No.: US 11,999,068 B2
(45) Date of Patent: Jun. 4, 2024

(54) CONTROL DEVICE AND ALIGNMENT DEVICE

(71) Applicant: OMRON Corporation, Kyoto (JP)

(72) Inventors: Katsuyuki Kawamata, Kyoto (JP); Kensuke Tarumi, Osaka (JP)

(73) Assignee: OMRON CORPORATION, Kyoto (JP)

( * ) Notice: Subject to any disclaimer, the term of this patent is extended or adjusted under 35 U.S.C. 154(b) by 457 days.

(21) Appl. No.: 17/435,214

(22) PCT Filed: Feb. 21, 2020

(86) PCT No.: PCT/JP2020/007108
§ 371 (c)(1),
(2) Date: Aug. 31, 2021

(87) PCT Pub. No.: WO2020/179507
PCT Pub. Date: Sep. 10, 2020

(65) Prior Publication Data
US 2022/0134570 A1    May 5, 2022

(30) Foreign Application Priority Data

Mar. 1, 2019   (JP) .................................. 2019-037808

(51) Int. Cl.
*B25J 9/16*       (2006.01)
*B25J 13/08*     (2006.01)
(Continued)

(52) U.S. Cl.
CPC ............. *B25J 9/1697* (2013.01); *B25J 13/08* (2013.01); *G05B 19/4155* (2013.01); *G06T 7/74* (2017.01); *G05B 2219/39369* (2013.01)

(58) Field of Classification Search
CPC ..... B25J 9/1697; B25J 13/08; G05B 19/4155; G05B 2219/39369; G06T 7/74
See application file for complete search history.

(56) References Cited

U.S. PATENT DOCUMENTS 11,847,841 B2 * 12/2023 Tellex ..................... G06F 18/29
2005/0273198 A1    12/2005 Bischoff
(Continued)

FOREIGN PATENT DOCUMENTS

JP        2011159210 A    8/2011
JP        2012123781 A    6/2012
(Continued)

OTHER PUBLICATIONS

International Search Report for International Application No. PCT/JP2020/007108; dated Apr. 14, 2020.
(Continued)

*Primary Examiner* — Kira Nguyen
(74) *Attorney, Agent, or Firm* — CANTOR COLBURN LLP

(57) ABSTRACT

A control device includes a first statistical processing unit a second statistical processing unit and a movement control unit. The first statistical processing unit acquires relative positions of the object calculated by the visual sensor and performs statistical processing on the acquired relative positions of the object. The second statistical processing unit acquires from the position sensor relative positions of the holding device corresponding to each of the relative positions of the object calculated by the visual sensor, and performs statistical processing on the acquired relative positions of the holding device. The movement control unit performs feedback control of the moving device based on the relative positions of the object and the relative positions of the holding, device and performs alignment of the object with the target position while moving the object closer to the target position.

9 Claims, 4 Drawing Sheets

(51) Int. Cl.
*G05B 19/4155* (2006.01)
*G06T 7/73* (2017.01)

(56) References Cited

U.S. PATENT DOCUMENTS

| | | | |
|---|---|---|---|
| 2013/0147944 A1 | 6/2013 | Zhang et al. | |
| 2013/0230235 A1 | 9/2013 | Tateno et al. | |
| 2014/0301632 A1* | 10/2014 | Ikeda | G06T 7/70 382/152 |
| 2015/0158176 A1 | 6/2015 | Fujita et al. | |
| 2016/0318187 A1* | 11/2016 | Tan | B25J 5/007 |
| 2018/0365791 A1 | 12/2018 | Namie et al. | |
| 2019/0099891 A1* | 4/2019 | Tomioka | B25J 9/1697 |
| 2019/0329409 A1* | 10/2019 | Yamada | B25J 9/1661 |
| 2022/0028056 A1* | 1/2022 | Kawamata | G05B 19/402 |

FOREIGN PATENT DOCUMENTS

| | | |
|---|---|---|
| JP | 2012154922 A | 8/2012 |
| JP | 2015213139 A | 11/2015 |
| JP | 2016173634 A | 9/2016 |
| JP | 2019003388 A | 1/2019 |
| WO | 2019208107 A1 | 10/2019 |
| WO | 2019208108 A1 | 10/2019 |

OTHER PUBLICATIONS

JPO Written Opinion of the International Searching Authority for International Application No. PCT/JP2020/007108; dated Apr. 14, 2020.
JPO Notice of Reasons for Refusal for corresponding JP Application No. 2019-037808; dated Nov. 16, 2021.
EPO Extended European Search Report for corresponding EP Application No. 20766905.2; dated Oct. 18, 2022.

* cited by examiner

CONTROL DEVICE AND ALIGNMENT DEVICE

CROSS REFERENCE TO RELATED APPLICATIONS

This is the U.S. national stage of application No. PCT/JP2020/007108, filed on Feb. 21, 2020. Priority under 35 U.S.C. § 119(a) and 35 U.S.C. § 365(b) is claimed from Japanese Application No. 2019-037808, filed Mar. 1, 2019, the disclosure of which is also incorporated herein by reference.

TECHNICAL FIELD

The present disclosure relates to a control device applicable to an alignment device and an alignment device including the control device.

BACKGROUND ART

Patent Document 1 discloses a position control system including a position determination unit that determines an estimated position of a control object, and a feedback control unit that outputs, to a drive device, control data for aligning the control object with a target position using the estimated position determined by the position determination unit. In the position control system, the estimated position of the control object is determined by using position-related data regarding the control object repeatedly acquired from the drive device that moves the control object and measurement data obtained by measuring a positional relationship between the control object and the target position by image processing.

PRIOR ART DOCUMENTS

Patent Documents

Patent Document 1: JP 2019-003388 A

SUMMARY OF THE INVENTION

Problems to be Solved by the Invention

In the position control system, when at least any of the position-related data from the drive device and the measurement data obtained by measuring a positional relationship between a control object and a target position varies or includes a vibration component or the like, there is a case where an accuracy of the estimated position of the control object to be determined varies and it may be difficult to shorten time for aligning the control object with the target position.

An object of the present disclosure is to provide a control device capable of controlling a moving device of an alignment device so as to shorten alignment time for an object with a target position, and an alignment device including the control device.

Solution to Problem

A control device according to an example of the present disclosure is capable of controlling a moving device of an alignment device,
the alignment device including:
a holding device capable of holding an object;
the moving device capable of moving the holding device to move the object to a target position;
a position sensor that calculates a relative position of the holding device with respect to a position when the object moves to the target position; and
a visual sensor that is arranged to be able to simultaneously image the object and the target position when the object is moved to the target position by the moving device, the visual sensor being capable of repeatedly calculating a relative position of the object with respect to the target position from a captured image.
The control device comprises:
a first statistical processing unit that acquires a plurality of the relative positions of the object calculated by the visual sensor and performs statistical processing on the acquired relative positions of the object;
a second statistical processing unit that acquires, from the position sensor, a plurality of the relative positions of the holding device corresponding to each of the plurality of the relative positions of the object calculated by the visual sensor, and performs statistical processing on the acquired relative positions of the holding device; and
a movement control unit that performs feedback control of the moving device based on the plurality of the relative positions of the object statistically processed by the first statistical processing unit and the plurality of the relative positions of the holding device statistically processed by the second statistical processing unit, and performs alignment of the object with the target position while moving the object closer to the target position.

An alignment device according to an example of the present disclosure includes:
the visual sensor;
the holding device;
the moving device; and
the control device.

An alignment method according to an example of the present disclosure comprises:
statistically processing a plurality of relative positions of an object calculated from images obtained as the object and a target position are repeatedly imaged simultaneously when the object held by a holding device is moved to the target position by a moving device;
statistically processing a plurality of relative positions of the holding device corresponding to each of a plurality of calculated relative positions of the object; and
performing feedback control of the moving device based on the relative positions of the object and the relative positions of the holding device that is statistically processed to perform alignment of the object with the target position while moving the object closer to the target position.

Advantageous Effects of Invention

According to the control device, based on the relative positions of the object statistically processed by the first statistical processing unit and the relative positions of the holding device statistically processed by the second statistical processing unit, the moving device is feedback-controlled to perform alignment of the object with the target position while the object is moved closer to the target position. For this reason, it is possible to realize the control device capable of controlling the moving device of the alignment device in a manner that alignment time of the object with the target position can be shortened by more accurately associating the relative position of the object with the relative position of the holding device.

According to the alignment device, it is possible to realize by the control device the alignment device capable of shortening the alignment time of the object with the target position.

According to the alignment method, based on the relative position of the object that is statistically processed and the relative position of the holding device that is statistically processed, the moving device is feedback-controlled to perform alignment with the target position while the object is moved closer to the target position. For this reason, the relative position of the object and the relative position of the holding device are more accurately associated with each other, and the alignment time of the object with the target position can be shortened.

DESCRIPTION OF EMBODIMENT

Hereinafter, an example of the present disclosure will be described with reference to the accompanying drawings. Note that, in description below, terms indicating specific directions or positions (for example, terms including "up," "down," "right," and "left") are used as necessary. However, use of these terms is for facilitating understanding of the present disclosure with reference to the drawings, and the technical scope of the present disclosure is not limited by meanings of these terms. Further, description below is merely exemplary in nature and is not intended to limit the present disclosure, or application or use of the present disclosure. Furthermore, the drawings are schematic, and ratios of dimensions and the like do not necessarily agree with actual ones.

Figure 1:
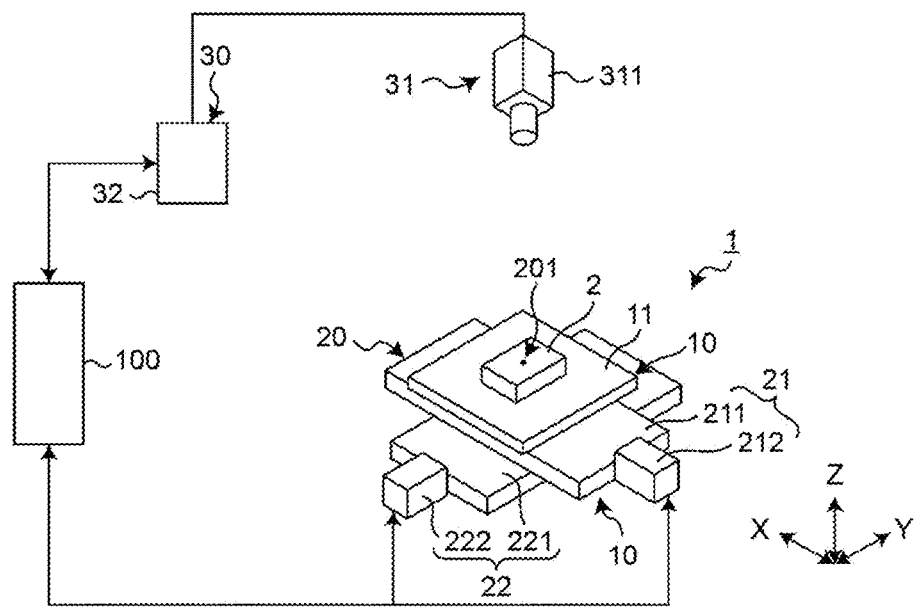
FIG. 1 is a perspective view illustrating an alignment device according to an embodiment of the present disclosure.

As illustrated in FIG. 1, a control device 100 according to an embodiment of the present disclosure is configured to be able to control a moving device 20 of an alignment device 1. As an example, the alignment device 1 includes a stage 10 capable of holding a workpiece 2, the moving device 20 that moves the stage 10, a visual sensor 30 capable of repeatedly imaging the workpiece 2 held by the stage 10, and the control device 100 that controls the moving device 20. Note that the workpiece 2 is an example of an object, and the stage 10 is an example of a holding device.

The stage 10 includes a holding surface 11 on which the workpiece 2 can be held. The stage 10 is configured to be movable along the holding surface 11 together with the workpiece 2 held on the holding surface 11.

The holding device is not limited to the stage 10, and may be, for example, an end effector.

Figure 2:
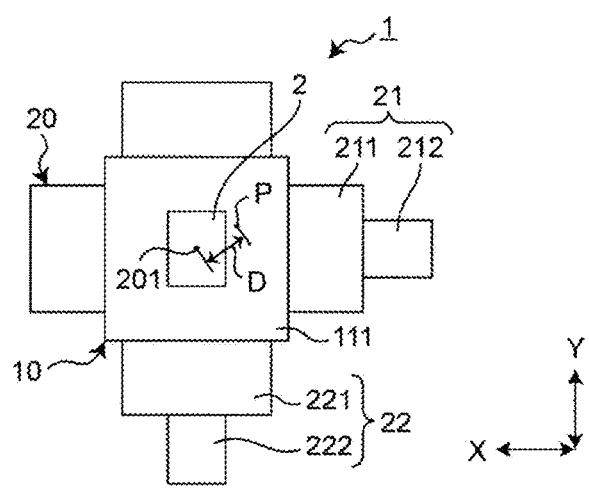
FIG. 2 is a plan view of a stage and a moving device of the alignment device of FIG. 1.

As illustrated in FIG. 2, the moving device 20 is configured to be able to move the stage 10 to move the workpiece 2 to the target position P.

Specifically, as illustrated in FIG. 2, the moving device 20 includes, as an example, a first drive unit 21 that moves the stage 10 in an X direction along the holding surface 11 and a second drive unit 22 that moves the stage 10 in a Y direction intersecting (for example, orthogonal to) with the X direction along the holding surface 11. The first drive unit 21 includes a first table 211 connected to the stage 10 and a motor 212 that moves the stage 10 in the X direction. The second drive unit 22 includes a second table 221 connected to the first table 211 and a motor 222 that moves the stage 10 in the Y direction together with the first table 211.

Each of the drive units 21 and 22 is provided with an encoder 23 (shown in FIG. 3) that detects rotation of the motors 212 and 222. The encoder 23 is an example of a position sensor, and calculates a relative position in the XY directions of the stage 10 with respect to the position in the XY directions of the stage 10 when the held workpiece 2 is located at the target position P (hereinafter, simply referred to as the relative position of the stage 10). The calculated position of the stage 10 is output to the control device 100.

The moving device 20 is not limited to the case of being configured to move the stage 10 along an XY plane (that is, two-dimensionally move). For example, the moving device 20 may be configured to three-dimensionally move the stage 10, or may be configured to accompany rotational movement in addition to two-dimensional movement and three-dimensional movement. The moving device 20 may be, for example, a multi-axis robot arm. In this case, the multi-axis robot arm may include a holding device composed of an end effector. That is, the holding device and the moving device 20 may be composed of a multi-axis robot arm.

As illustrated in FIG. 1, the visual sensor 30 includes, as an example, an imaging unit 31 having one camera 311 whose imaging axis is parallel to a Z direction, and an image processing unit 32. The camera 311 of the imaging unit 31 is arranged to be able to simultaneously image a reference point 201 (shown in FIG. 2) and the target position P of the workpiece 2 when the workpiece 2 held on the stage 10 is moved to the target position P (shown in FIG. 2) by the moving device 20. The image processing unit 32 is configured to be able to repeatedly calculate a relative position in the XY directions of the reference point 201 of the workpiece 2 with respect to the target position P (hereinafter, simply referred to as the relative position of the workpiece 2) from an image captured by the imaging unit 31.

The reference point 201 of the workpiece 2 is a reference for aligning the workpiece 2 with the target position P, and at least one of the reference point 201 is provided for the workpiece 2. The target position P is optionally set according to design of the alignment device 1.

The imaging unit 31 is not limited to the case of including one of the camera 311, and may include two or more cameras. The camera 311 is not limited to the case of being arranged such that the imaging axis is parallel to the Z direction, and may be arranged such that the imaging axis is parallel to the X direction or the Y direction.

The control device 100 is, for example, a PLC (programmable logic controller). The control device 100 includes a processor such as a CPU that performs calculation, a storage medium such as a ROM and a RAM that stores a program or data necessary for controlling the moving device 20, and an interface that inputs and outputs a signal to and from the outside of the alignment device 1.

Figure 3:
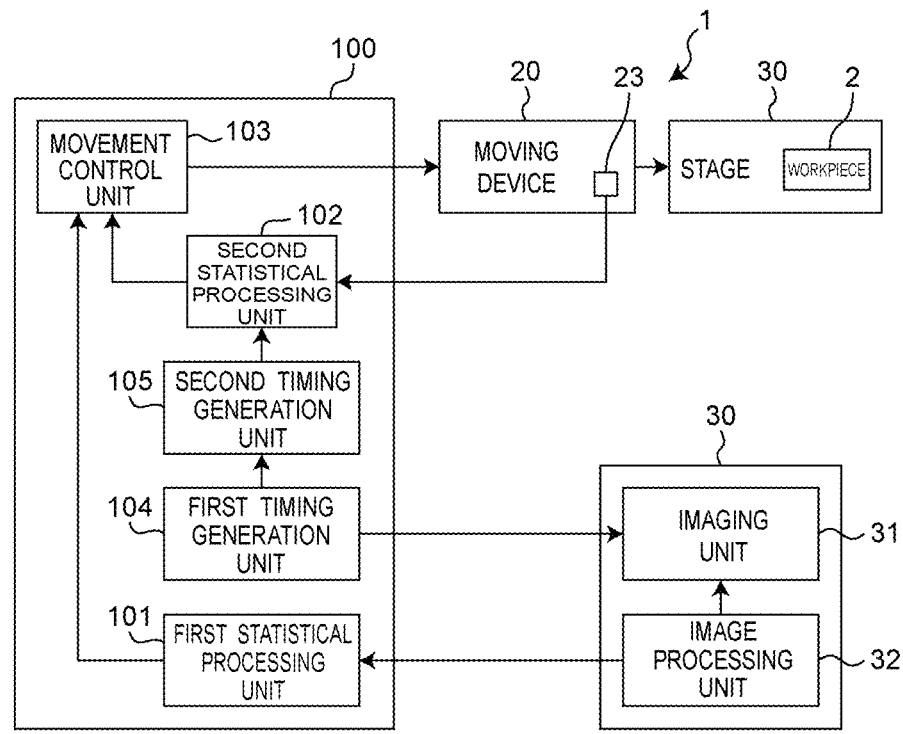
FIG. 3 is a block diagram illustrating a configuration of the alignment device of FIG. 1.

Specifically, as illustrated in FIG. 3, the control device 100 includes a first statistical processing unit 101, a second statistical processing unit 102, a movement control unit 103, a first timing generation unit 104, and a second timing generation unit 105. Each of these units of the control device 100 is a function implemented by the processor executing a predetermined program.

The first statistical processing unit 101 statistically processes a plurality of the relative positions of the workpiece 2 calculated by the visual sensor 30.

Specifically, the first statistical processing unit 101 determines whether or not to statistically process the plurality of the relative positions of the workpiece 2 calculated by the visual sensor 30 according to a direct distance D (illustrated in FIG. 2) between the target position P and the reference point 201 of the workpiece 2 calculated by the visual sensor 30. Then, the first statistical processing unit 101 acquires the plurality of the relative positions of the workpiece 2 calculated by the image processing unit 32 of the visual sensor 30 from when it is determined that a plurality of the relative positions of the workpiece 2 calculated by the visual sensor 30 are subjected to the statistical processing to an end of alignment processing of the workpiece 2 with the target position P, and smooths a plurality of acquired relative positions of the workpiece 2 by a moving average.

The second statistical processing unit 102 acquires, from the encoder 23, the relative positions of the stage 10 corresponding to each of a plurality of the relative positions of the workpiece 2 calculated by the visual sensor 30, and statistically processes a plurality of acquired relative positions of the stage 10.

Specifically, similarly to the first statistical processing unit 101, the second statistical processing unit 102 determines whether or not to statistically process the plurality of the relative positions of the workpiece 2 calculated by the visual sensor 30 according to the direct distance D (illustrated in FIG. 2) between the target position P and the reference point 201 of the workpiece 2 calculated by the visual sensor 30. Then, the second statistical processing unit 102 acquires a device position of the stage 10 calculated by the encoder 23 every time a second timing signal output from the second timing generation unit 105 is received, from when it is determined that the plurality of the relative positions of the workpiece 2 calculated by the visual sensor 30 are subjected to the statistical processing to the end of alignment processing of the workpiece 2 with the target position P, and smooths a plurality of acquired relative positions of the stage 10 by a moving average.

The movement control unit 103 performs feedback control of the moving device 20 based on the relative position of the workpiece 2 statistically processed by the first statistical processing unit 101 and the relative position of the stage 10 statistically processed by the second statistical processing unit 102. Specifically, the movement control unit 103 calculates an estimated position of the workpiece 2 using the relative position of the workpiece 2 that is statistically processed and the relative position of the stage 10 that is statistically processed. Then, the movement control unit 103 performs feedback control of the moving device 20 using the calculated estimated position of the workpiece 2 to perform alignment of the workpiece 2 with the target position P while moving the reference point 201 of the workpiece 2 closer to the target position P. At this time, a coordinate system of the relative position of the workpiece 2 is converted into a coordinate system of the relative position of the stage 10 using a calibration parameter. That is, the movement control unit 103 is configured to perform visual feedback control that repeats feedback control minimizing a position deviation between a current position of the reference point 201 of the workpiece 2 and the target position P.

The first timing generation unit 104 outputs a first timing signal for causing the imaging unit 31 of the visual sensor 30 to image the workpiece 2. Every time the first timing signal is input, the imaging unit 31 simultaneously images the reference point 201 of the workpiece 2 and the target position P.

The second timing generation unit 105 outputs the second timing signal that causes the second statistical processing unit 102 to acquire the relative position of the stage 10 calculated by the encoder 23 on and after the first timing signal is output by the first timing generation unit 104. The second timing signal is output based on response time from when the first timing signal is output to when the visual sensor 30 images the workpiece 2 (that is, response delay time) and exposure time when the visual sensor 30 images the workpiece 2.

Figure 4:
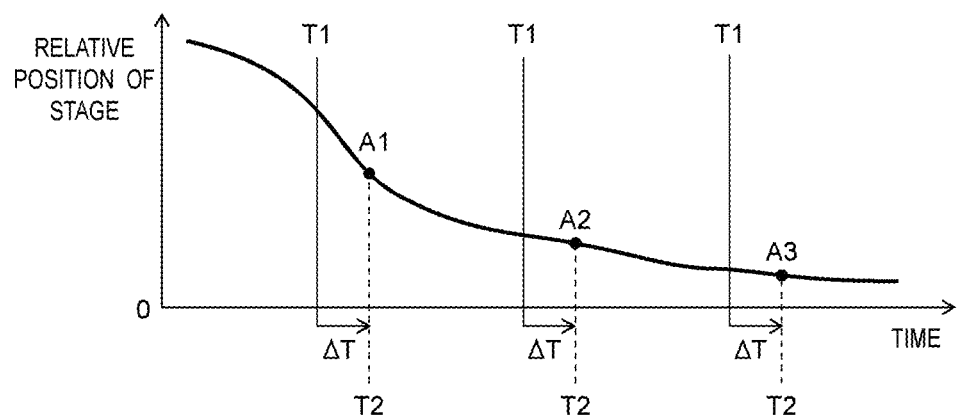
FIG. 4 is a graph illustrating a relationship between a first timing signal and a second timing signal of a control device according to the embodiment of the present disclosure.

The visual sensor 30 has response time from when the first timing signal is output to when the workpiece 2 is imaged by the imaging unit 31. Further, distortion (what is called blurring) occurs in an imaging result (that is, at the calculated relative position of the workpiece 2) according to exposure time (that is, exposure time when the workpiece 2 is imaged by the visual sensor 30) necessary for the imaging unit 31 to image the workpiece 2 to acquire an image and a movement amount of the workpiece 2 in the exposure time. For this reason, as illustrated in FIG. 4, the second timing signal is output (indicated by T2 in FIG. 4) in a manner delayed by time $\Delta T$ that is obtained by combining response time from when the first timing signal is output (indicated by T1 in FIG. 4) to when the workpiece 2 is imaged and adjustment time according to exposure time of when the workpiece 2 is imaged by the visual sensor 30, so that the distortion of an imaging result is suppressed.

The response time from when the first timing signal is output to when the visual sensor 30 images the workpiece 2 is set in advance from, for example, performance of the visual sensor 30. Specifically, the response time is, for example, several $\mu s$ to several tens of $\mu s$ in a case where transfer is made via a digital ON/OFF signal, and is several tens of $\mu s$ to several ms via communication such as a field network. The exposure time when the workpiece 2 is imaged by the visual sensor 30 is set on the basis of, for example, a condition such as an illumination environment, performance of an image element, and a lens to be used, and is approximately several tens of ms to several hundreds of ms.

Next, an example of alignment processing for alignment with the target position P while moving the reference point 201 of the workpiece 2 closer to the target position P will be described with reference to FIG. 5 and FIG. 6. These pieces of processing described below are performed by the control device 100 executing a predetermined program.

Figure 5:
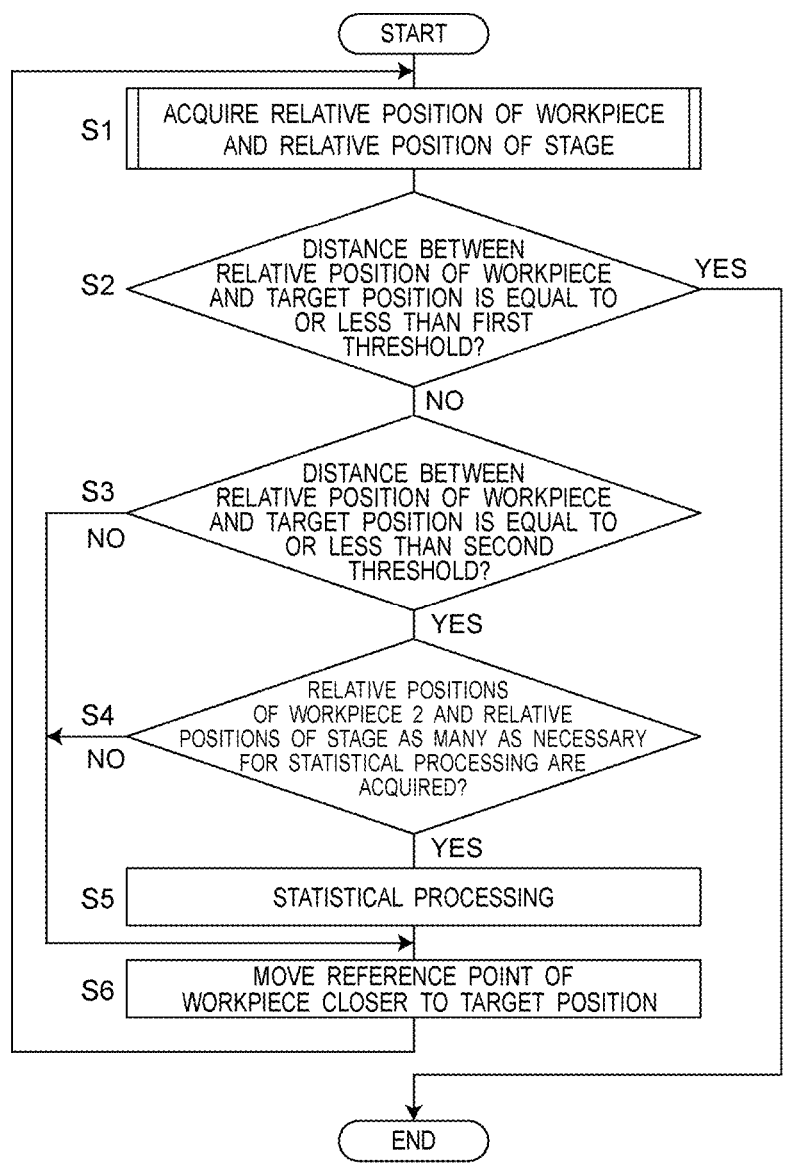
FIG. 5 is a first flowchart for explaining alignment processing of the control device of FIG. 4.

As illustrated in FIG. 5, the control device 100 acquires the relative position of the workpiece 2 from the visual sensor 30, and acquires the relative position of the stage 10 corresponding to the relative position of the workpiece 2 acquired from the encoder 23 (Step S1).

Figure 6:
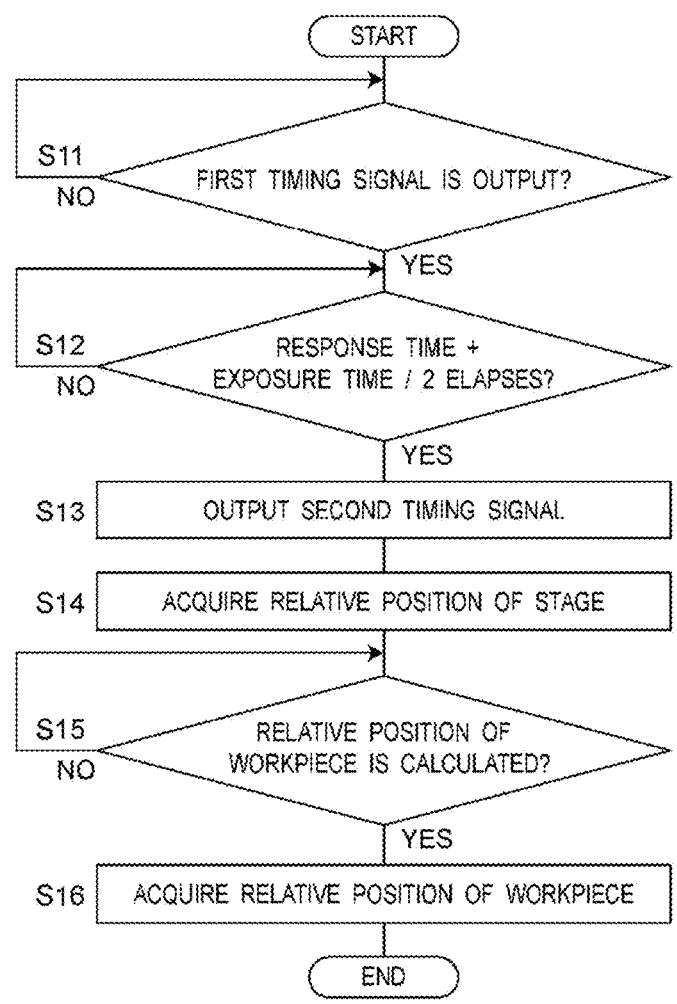
FIG. 6 is a second flowchart for explaining the alignment processing of the control device of FIG. 4.

Step S1 is processed as illustrated in FIG. 6. That is, the first statistical processing unit 101 determines whether or not the first timing signal is output from the first timing generation unit 104 (Step S11). Step S11 is repeated until it is determined that the first timing signal is output from the first timing generation unit 104. When the first timing signal is output, the workpiece 2 is imaged by the imaging unit 31 of the visual sensor 30, and the relative position of the workpiece 2 is calculated by the image processing unit 32.

When it is determined that the first timing signal is output from the first timing generation unit 104, the second timing generation unit 105 determines whether or not time calculated by, for example, (response time acquired in advance+ exposure time acquired in advance)/2 (hereinafter, referred to as the correction time) has elapsed from when the first timing signal is output (Step S12). Step S12 is repeated until it is determined that the correction time has elapsed from when the first timing signal is output.

The correction time may be any time as long as the time specifies an imaging timing of the workpiece 2 determined according to a characteristic of the visual sensor 30. For example, in a case where the imaging timing is specified at an optional time determined in advance as in self-timer of a general still camera, a determination formula in which the optional time is included in the correction time is used.

If it is determined that the correction time has elapsed from when the first timing signal is output, the second timing generation unit 105 outputs the second timing signal (Step S13). When the second timing signal is output, the second statistical processing unit 102 acquires the relative position of the stage 10 of when the second timing signal is output (that is, the relative position of the stage 10 corresponding to the relative position of the workpiece 2 acquired in Step S16) (Step S14).

When the relative position of the stage 10 is acquired, the first statistical processing unit 101 determines whether or not the relative position of the workpiece 2 is calculated by the visual sensor 30 (Step S15). This Step S15 is repeated until it is determined that the relative position of the workpiece 2 is calculated. When it is determined that the relative position of the workpiece 2 is calculated, the first statistical processing unit 101 acquires the relative position of the workpiece 2 when the first timing signal is output (Step S16).

As illustrated in FIG. 5, when the relative position of the workpiece 2 and the relative position of the stage 10 are acquired in Step S1, the movement control unit 103 determines whether or not the distance D between the acquired relative position of the workpiece 2 and the target position P is equal to or less than a first threshold (Step S2). The first threshold is, for example, a maximum value of an allowable error in alignment of the reference point 201 of the workpiece 2 with the target position P, and is set in advance. That is, when it is determined that the distance D is equal to or less than the first threshold, the alignment processing ends.

In a case where it is determined that the distance D is larger than the first threshold, each of the first statistical processing unit 101 and the second statistical processing unit 102 determines whether or not the distance D is equal to or less than a second threshold (>the first threshold) (Step S3). The second threshold is set in advance in consideration of two points described below, for example.

(1) Immediately after a start of the alignment processing, the distance D between the relative position of the workpiece 2 calculated by the visual sensor 30 and the target position P is large, and a motion amount of the stage 10 is also large. However, as the alignment processing progresses, the distance D between the calculated relative position of the workpiece 2 and the target position P becomes smaller, and accordingly, the motion amount of the stage 10 also becomes smaller. Therefore, it is not necessary to consider the relative position of the workpiece 2 and the relative position of the stage immediately after the start of the alignment processing.

(2) In a case where past information such as a moving average is used for the statistical processing, considering the relative position of the workpiece 2 and the relative position of the stage immediately after the start of the alignment processing with a large deviation is a factor of overshoot due to excessive operation.

In a case where it is determined that the distance D is equal to or less than the second threshold, each of the first statistical processing unit 101 and the second statistical processing unit 102 determines whether or not the relative positions of the workpiece 2 and the relative positions of the stages as many as necessary for the statistical processing are acquired (Step S4). The number required for the statistical processing is set on the basis of a statistical numerical value calculated from a confidence coefficient in a case where required accuracy is set as a confidence interval and variance of the acquired relative positions, for example, assuming that dispersion of the acquired relative positions follows a normal distribution in a case where averaging is performed. Specifically, the calculated statistical numerical value is increased or decreased in consideration of an operation result of the alignment device 1 in a case where the number of samples (that is, the average number) is reduced while the alignment device 1 is actually operated and in consideration of required alignment time.

In a case where it is determined that the relative positions of the workpiece 2 and the relative positions of the stage as many as necessary for the statistical processing are acquired, each of the first statistical processing unit 101 and the second statistical processing unit 102 performs the statistical processing on the acquired relative positions of the workpiece 2 and the acquired relative positions of the stage (Step S5).

In a case where it is determined in Step S3 that the distance D is larger than the second threshold, and in a case where it is determined in Step S4 that the relative positions of the workpiece 2 and the relative positions of the stage as many as necessary for the statistical processing are not acquired, the movement control unit 103 performs feedback control of the moving device 20 to move the stage 10 on the basis of the relative position of the workpiece 2 and the relative position of the stage that are acquired immediately before, and make the reference point 201 of the workpiece 2 closer to the target position P. In contrast, in a case where the relative positions of the workpiece 2 and the relative positions of the stage are statistically processed in Step S5, the movement control unit 103 performs feedback control of the moving device 20 to move the stage 10 on the basis of the relative position of the workpiece 2 and the relative position of the stage 10 that are statistically processed, and make the reference point 201 of the workpiece 2 closer to the target position P (Step S6).

When Step S6 ends, the processing returns to Step S1, and the relative position of the workpiece 2 and the relative position of the stage 10 corresponding to the relative position of the workpiece 2 are acquired again. Until the moving device 20 is controlled based on the relative position of the workpiece 2 and the relative position of the stage newly acquired in Step S1 again, the moving device 20 is controlled based on the relative position of the workpiece 2 and the relative position of the stage that are acquired immediately before. That is, once the movement is started, the stage 10 continues to move without stopping until the alignment processing ends.

As described above, according to the control device 100, based on the relative position of the workpiece 2 statistically processed by the first statistical processing unit 101 and the relative position of the stage 10 statistically processed by the second statistical processing unit 102, the moving device 20 is feedback-controlled to perform alignment of the workpiece 2 with the target position P while the reference point 201 of the workpiece 2 is moved closer to the target position P. With such a configuration, the relative position of the workpiece 2 updated in a relatively long period can be accurately associated with the relative position of the stage 10 updated in a relatively short period. As a result, it is possible to realize the control device 100 capable of controlling the moving device 20 of the alignment device 1 in a manner that alignment time of the workpiece 2 with the target position P can be shortened by more accurately associating the relative position of the workpiece 2 with the relative position of the stage 10.

According to an alignment method executed by the control device 100, the moving device 20 is feedback-controlled on the basis of the relative position of the workpiece 2 that is statistically processed and the relative position of the stage 10 that is statistically processed, and the workpiece 2 is aligned with the target position P while being moved closer to the target position P. For this reason, even in a case where there is dispersion in the relative position of the workpiece 2 calculated by the visual sensor 30 and the relative position of the stage 10 calculated by the encoder 23, the workpiece 2 can be aligned with the target position P with high accuracy.

The control device 100 further includes the first timing generation unit 104 and the second timing generation unit 105. The first timing generation unit 104 outputs the first timing signal for causing the visual sensor 30 to image the workpiece 2. The second timing generation unit 105 outputs the second timing signal for causing the second statistical processing unit 102 to acquire the relative position of the stage 10 calculated by the encoder 23 based on the response time and the exposure time. The response time is time from when the first timing signal is output to when the visual sensor 30 images the workpiece 2 after the first timing signal is output by the first timing generation unit 104. The exposure time is time when the visual sensor 30 images the workpiece 2. With such a configuration, the relative position of the workpiece 2 and the relative position of the stage 10 can be more accurately associated with each other.

The statistical processing performed by each of the first statistical processing unit 101 and the second statistical processing unit 102 is a moving average. With such a configuration, the processing load of the control device 100 can be reduced.

The first statistical processing unit 101 determines whether or not to statistically process the relative positions of the workpiece 2 calculated by the visual sensor 30 according to the distance D between the target position P and the relative positions of the target workpiece 2 calculated by the visual sensor 30. The second statistical processing unit 102 determines whether or not to statistically process the acquired relative positions of the stage 10 according to the distance D. With such a configuration, the relative position of the workpiece 2 and the relative position of the stage 10 can be more accurately associated with each other.

That is, the alignment device 1 that can shorten the alignment time of the workpiece 2 with the target position P can be realized with the control device 100.

The control device 100 only needs to include the first statistical processing unit 101, the second statistical processing unit 102, and the movement control unit 103. For example, the first timing generation unit 104 and the second timing generation unit 105 may be omitted. In this case, each of the statistical processing units 101 and 102 can be configured to autonomously acquire the relative position of the workpiece 2 and the relative position of the stage 10 at a preset fixed timing.

The statistical processing performed by each of the first statistical processing unit 101 and the second statistical processing unit 102 is not limited to the case of using a moving average, and a median (that is, a median value) may be used.

Each of the first statistical processing unit 101 and the second statistical processing unit 102 only needs to be able to statistically process a plurality of the acquired relative positions of the workpiece 2 or a plurality of the acquired relative positions of the stage 10. That is, Steps S3 and S4 in FIG. 5 can be omitted.

Various embodiments of the present disclosure are described above in detail with reference to the drawings. Finally, various aspects of the present disclosure will be described. Note that, in description below, as an example, a reference numeral is also added.

A control device 100 according to a first aspect of the present disclosure that is capable of controlling a moving device 20 of an alignment device 1 including:
- a holding device 10 capable of holding an object 2;
- the moving device 20 capable of moving the holding device 10 to move the object 2 to a target position P;
- a position sensor 23 that calculates a relative position of the holding device 10 with respect to a position when the object 2 moves to the target position P; and
- a visual sensor 30 that is arranged to be able to simultaneously image the object 2 and the target position P when the object 2 is moved to the target position P by the moving device 20, the visual sensor 30 being capable of repeatedly calculating a relative position of the object 2 with respect to the target position P from a captured image, the control device 100 comprises:
- a first statistical processing unit 101 that acquires a plurality of relative positions of the object 2 calculated by the visual sensor 30 and performs statistical processing on a plurality of acquired relative positions of the object;
- a second statistical processing unit 102 that acquires, from the position sensor 23, a plurality of relative positions of the holding device 10 corresponding to each of the relative positions of the object 2 calculated by the visual sensor 30, and performs statistical processing on a plurality of acquired relative positions of the holding device 10; and
- a movement control unit 103 that performs feedback control of the moving device 20 based on the relative positions of the object 2 statistically processed by the first statistical processing unit 101 and the relative positions of the holding device 10 statistically processed by the second statistical processing unit 102, and performs alignment of the object 2 with the target position P while moving the object 2 closer to the target position P.

According to the control device 100 of the first aspect, it is possible to accurately associate the relative position of the object 2 updated in a relatively long period with the relative position of the holding device 10 updated in a relatively short period. As a result, it is possible to realize the control device 100 capable of controlling the moving device 20 of the alignment device 1 in a manner that alignment time of the object 2 with the target position P can be shortened by more accurately associating the relative position of the object 2 with the relative position of the holding device 10.

The control device 100 according to a second aspect of the present disclosure further comprises:
- a first timing generation unit 104 that outputs a first timing signal for causing the visual sensor 30 to image the object 2; and
- a second timing generation unit 105 that on and after the first timing signal is output by the first timing generation unit 104, outputs a second timing signal for causing the second statistical processing unit 102 to acquire the relative positions of the holding device 10 calculated by the position sensor 23 based on a response time from when the first timing signal is output to when the visual sensor 30 images the object 2 and an exposure time of when the visual sensor 30 images the object 2.

According to the control device 100 of the second aspect, a relative position of the workpiece 2 and a relative position of the stage 10 can be more accurately associated with each other.

In the control device 100 according to a third aspect of the present disclosure, the statistical processing performed by each of the first statistical processing unit 101 and the second statistical processing unit 102 is a moving average.

According to the control device 100 of the third aspect, the processing load of the control device 100 can be reduced.

In the control device 100 according to a fourth aspect of the present disclosure,
- the first statistical processing unit 101 determines whether or not to statistically process the relative positions of the object 2 calculated by the visual sensor 30 according to a distance D between the target position P and the relative positions of the object 2 calculated by the visual sensor 30, and
- the second statistical processing unit 102 determines whether or not to statistically process the acquired relative positions of the holding device 10 according to the distance D.

Immediately after a start of the alignment control, the distance D between a relative position of the object 2 calculated by the visual sensor 30 and the target position P is large, and a motion amount of the holding device 10 is also large. Considering the relative position of the workpiece 2 and a relative position of the stage immediately after the start of the alignment processing having a large deviation as described above is a factor of overshoot due to excessive operation, and may cause increase in the alignment time. According to the control device 100 of the fourth aspect, since the alignment of the object 2 with the target position P can be performed without considering the relative position of the workpiece 2 and the relative position of the stage immediately after the start of the alignment processing, the alignment time of the object 2 with the target position P can be more reliably shortened.

The alignment device 1 according to a fifth aspect of the present disclosure comprises:
- the holding device 10;
- the moving device 20;
- the position sensor 23;
- the visual sensor 30; and
- the control device 100 of the above aspect.

According to the alignment device 1 of the fifth aspect, it is possible to realize by the control device 100 the alignment device 1 capable of shortening the alignment time of the object 2 with the target position P.

An alignment method according to a sixth aspect of the present disclosure comprises:
- statistically processing a plurality of relative positions of an object 2 calculated from images obtained as the object 2 and a target position P are repeatedly imaged simultaneously when the object 2 held by a holding device 10 is moved to the target position P by a moving device 20;
- statistically processing a plurality of relative positions of the holding device 10 corresponding to each of a plurality of calculated relative positions of the object 2; and
- performing feedback control of the moving device 20 based on the relative positions of the object 2 and the relative positions of the holding device 10 statistically processed to perform alignment of the object 2 with the target position P while moving the object 2 closer to the target position P.

According to the alignment method of the sixth aspect, the relative position of the object 2 and the relative position of the holding device 10 are more accurately associated with each other, and the alignment time of the object 2 with the target position P can be shortened.

Note that by appropriately combining optional embodiments or variations among the various embodiments or variations described above, effects of the embodiments or variations can be achieved. Further, a combination of embodiments, a combination of examples, or a combination of an embodiment and an example is possible, and a combination of features in different embodiments or examples is also possible.

Although the present disclosure is sufficiently described in connection with a preferred embodiment with reference to the accompanying drawings, various changes and modifications are obvious to those skilled in the art. Such changes and modifications are to be understood as being included within the scope of the present disclosure as set forth in the appended claims as long as not deviating from the scope.

INDUSTRIAL APPLICABILITY

The control device of the present disclosure can be applied to, for example, an alignment device.

The alignment device of the present disclosure can be applied to, for example, an automatic assembling device.

DESCRIPTION OF SYMBOLS 1 alignment device
2 workpiece
201 reference point
10 stage
11 holding surface
20 moving device
21 first drive unit
211 first table
212 motor
22 second drive unit
221 second table
222 motor
23 encoder
30 visual sensor
31 imaging unit
311 camera
32 image processing unit
100 control device
101 first statistical processing unit 102 second statistical processing unit
103 movement control unit
104 first timing generation unit
105 second timing generation unit
P target position

The invention claimed is:

1. A control device that is capable of controlling a moving device of an alignment device,
the alignment device including:
a holding device capable of holding an object;
the moving device capable of moving the holding device to move the object to a target position;
a position sensor that calculates a relative position of the holding device with respect to a position when the object moves to the target position; and
a visual sensor that is arranged to be able to simultaneously image the object and the target position when the object is moved to the target position by the moving device, the visual sensor being capable of repeatedly calculating a relative position of the object with respect to the target position from a captured image,
the control device comprising:
a first statistical processing unit that acquires a plurality of relative positions of the object calculated by the visual sensor and performs statistical processing on the acquired relative positions of the object;
a second statistical processing unit that acquires, from the position sensor, a plurality of relative positions of the holding device corresponding to each of the relative positions of the object calculated by the visual sensor, and performs statistical processing on the acquired relative positions of the holding device; and
a movement control unit that performs feedback control of the moving device based on the relative positions of the object statistically processed by the first statistical processing unit and the relative positions of the holding device statistically processed by the second statistical processing unit, and performs alignment of the object with the target position while moving the object closer to the target position.

2. The control device according to claim 1, further comprising:
a first timing generation unit that outputs a first timing signal that causes the visual sensor to image the object; and
a second timing generation unit that on and after the first timing signal is output by the first timing generation unit, outputs a second timing signal that causes the second statistical processing unit to acquire the relative positions of the holding device calculated by the position sensor based on a response time from when the first timing signal is output to when the visual sensor images the object and an exposure time of when the visual sensor images the object.

3. The control device according to claim 2, wherein
the statistical processing performed by each of the first statistical processing unit and the second statistical processing unit is a moving average.

4. The control device according to claim 2, wherein
the first statistical processing unit determines whether or not to statistically process the relative positions of the object calculated by the visual sensor according to a distance between the target position and the relative positions of the object calculated by the visual sensor, and
the second statistical processing unit determines whether or not to statistically process the acquired relative positions of the holding device according to the distance.

5. The control device according to claim 1, wherein
the statistical processing performed by each of the first statistical processing unit and the second statistical processing unit is a moving average.

6. The control device according to claim 5, wherein
the first statistical processing unit determines whether or not to statistically process the relative positions of the object calculated by the visual sensor according to a distance between the target position and the relative positions of the object calculated by the visual sensor, and
the second statistical processing unit determines whether or not to statistically process the acquired relative positions of the holding device according to the distance.

7. The control device according to claim 1, wherein
the first statistical processing unit determines whether or not to statistically process the relative positions of the object calculated by the visual sensor according to a distance between the target position and the relative positions of the object calculated by the visual sensor, and
the second statistical processing unit determines whether or not to statistically process the acquired relative positions of the holding device according to the distance.

8. The alignment device comprises:
the holding device;
the moving device;
the position sensor;
the visual sensor; and
the control device according to claim 1.

9. An alignment method comprising:
statistically processing a plurality of relative positions of an object calculated from images obtained as the object and a target position are repeatedly imaged simultaneously when the object held by a holding device is moved to the target position by a moving device;
statistically processing a plurality of relative positions of the holding device corresponding to each of a plurality of calculated relative positions of the object; and
performing feedback control of the moving device based on the relative positions of the object and the relative positions of the holding device statistically processed to perform alignment of the object with the target position while moving the object closer to the target position.

* * * * *